United States Patent Office 3,236,934
Patented Feb. 22, 1966

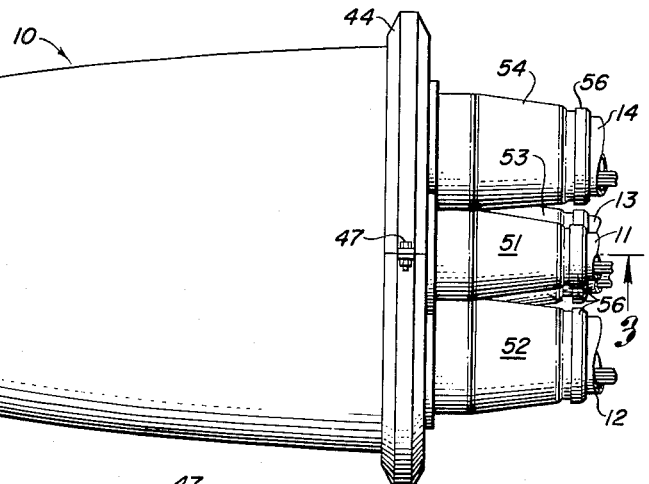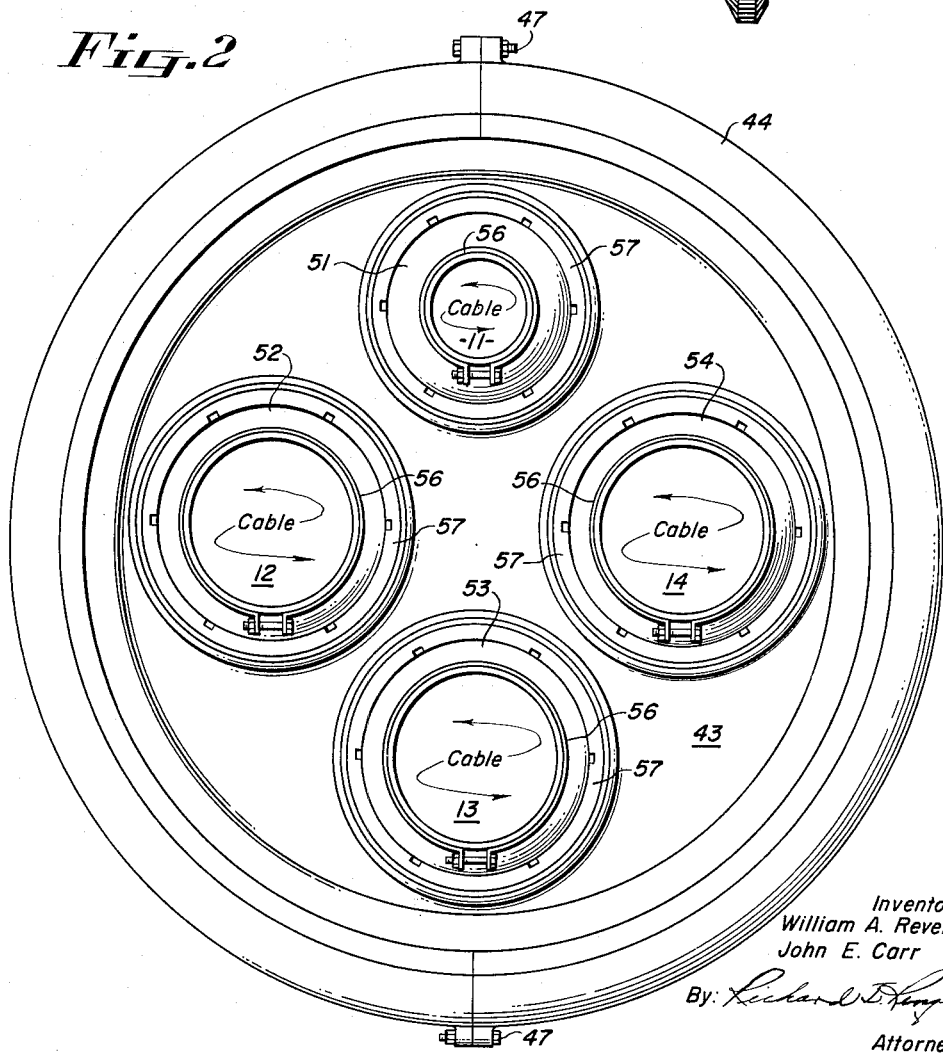

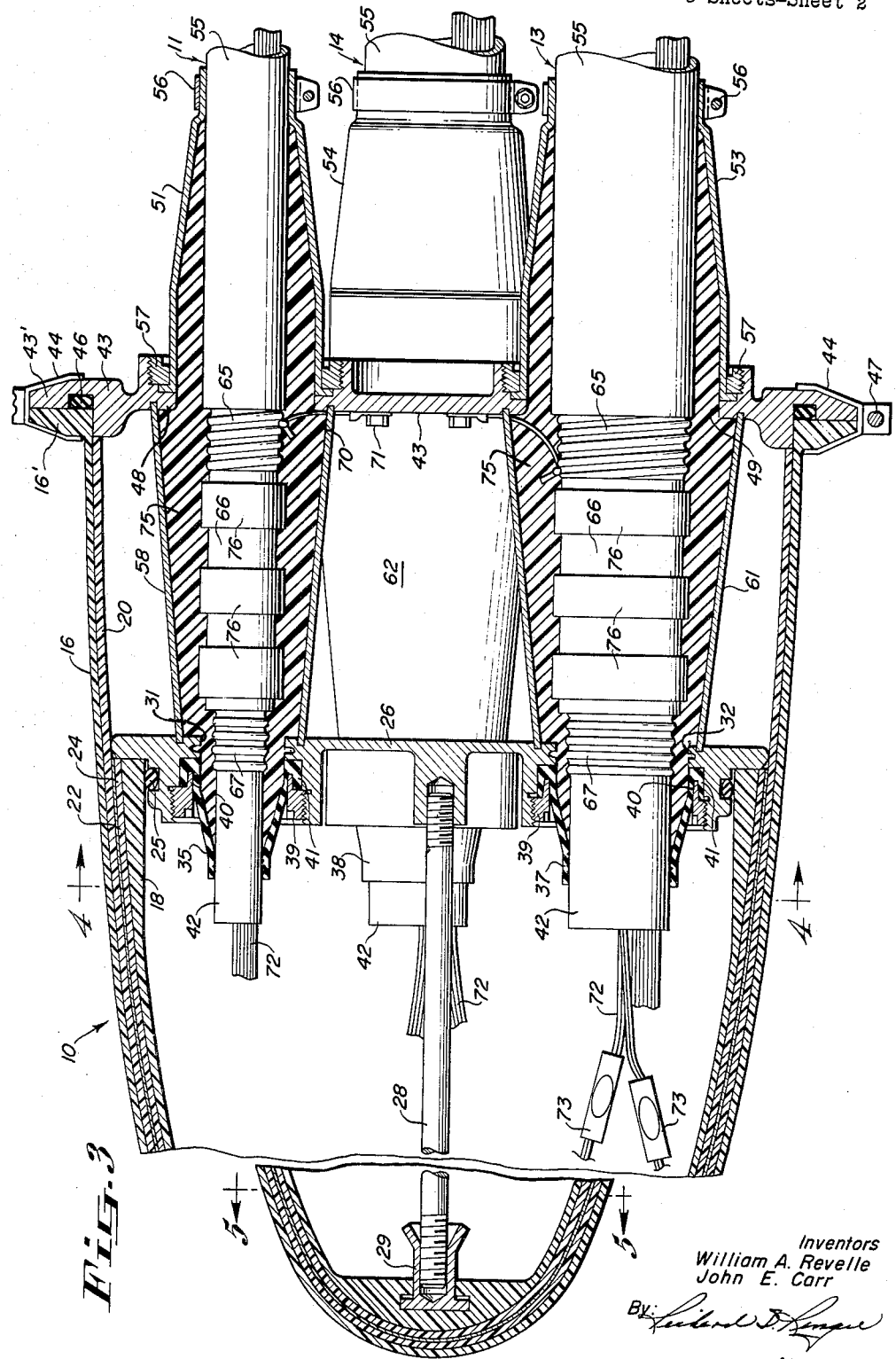

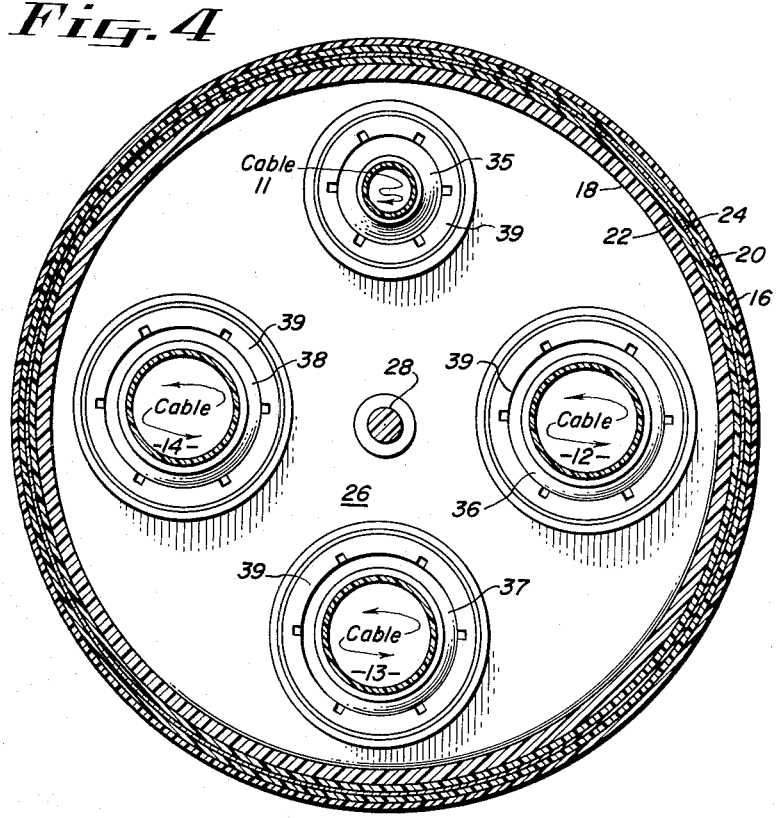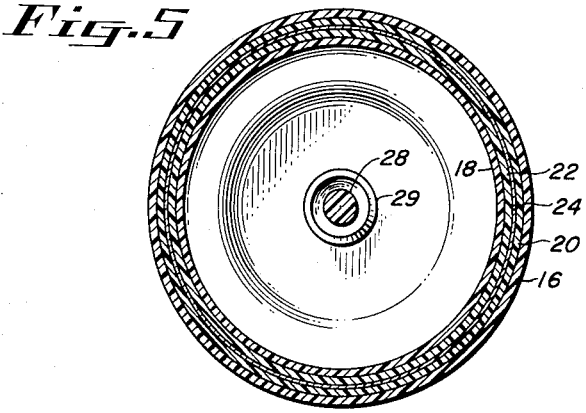

3,236,934
SEALING ASSEMBLY FOR ELECTRICAL CABLES AND THE LIKE
William A. Revelle, Gardena, and John E. Carr, Playa Del Rey, Calif., assignors, by mesne assignments, to E. A. "Al" Beckman, Compton, Calif.
Filed Aug. 29, 1963, Ser. No. 305,257
10 Claims. (Cl. 174—22)

The present invention is directed to a sealing assembly and, more particularly, to an improved sealing assembly for electrical cables which assembly provides a fluid-tight chamber for cable splices and is capable of being readily dismantled.

There are many applications that require electrical cables to be buried underground and underwater. Sometimes these cables remain buried for long periods of time, as long as ten years, and sometimes they are dug up within six months and relocated. Therefore, for ease of handling, individual electrical conductors are grouped in a conduit to form a cable. When electrical cables are buried underground or underwater for any extended period of time, the cables should be provided with a gas conduit acting as a moisture barrier so that moisture does not penetrate the cable and thereby interrupt power and/or communication provided by these cables. Interruption of power or communication can be extremely serious especially if the cables are used to control emergency equipment. If the interruption of service is produced as a result of open or short circuit conditions between conductors, this condition is quickly located by measuring the resistance of the various conductors in a well known manner. However, to locate a leak in the gas conduit before the leak causes an interruption of service present electrical cables provide for piping dry nitrogen or other suitable gas through the gas conduit and also provide spaced transducers to sense the gas pressure therein. If a leak is formed through the barrier wall of the gas conduit the gas under pressure would escape, and the gas pressure drops at that point in the cable. The escaping gas helps prevent moisture from entering the barrier until the cause can be corrected. The determination of the location of a leak in the barrier is accomplished with the aid of the pressure transducers in the cable.

An efficient moisture barrier is readily formed on continuous lengths of cable, but an efficient moisture barrier, up to now, could not be readily and efficiently formed at a cable splice. If the splice should be of the type that is capable of being readily dismantled, and if the splice should be able to pipe the dry nitrogen in the same manner as the cable, the problem of forming a splice with an efficient moisture barrier is further complicated.

A sealing assembly that is useful for splicing electrical cables and being buried underground is disclosed in a copending U.S. patent application, Serial No. 249,886, filed January 7, 1963, and having the same assignee as this application. The sealing assemblies of the prior art protectively enclose the spliced ends of two lengths of electrical cables, and the sealing assembly has some of the mechanical and physical properties of the electrical cable, for example, one property of this assembly is that dry nitrogen is able to flow through the cables and sealing assembly. The sealing assembly also has the advantage that it can be readily dismantled and reassembled as required to provide the fluid-tight sealed splice chamber. However, if the cables are required to pipe dry nitrogen under relatively higher pressure, the high pressure within the sealing assembly enclosure forces the cables out of the sealing assembly whereby the integral gas conduit for the cable (splice chamber) is destroyed at the splice.

Therefore, a primary object of this invention is to provide an improved sealing assembly for splicing electrical cables which assembly is able to be assembled and disassembled without degradation of any of the parts.

Another object of the present invention is to provide a sealing assembly for splicing electrical cables which withstands relatively high internal pressure without pushing the cables out of the sealing assembly.

A further object is to provide a splice case capable of withstanding forces due to pressure or other causes and externally or internally produced on said case.

Still another object of this invention is to provide an improved sealing assembly which has substantially the same mechanical and electrical properties of the cables that are to be spliced.

Briefly, the invention provides, preferably, a cone-shaped casing and a cover closing the opening thereof and secured thereto. The cover has a plurality of openings disposed to receive one end of various cables that are to be spliced. Fixed to the periphery of each opening and coaxial therewith are sleeves, preferably tapered, that extend inward of the casing and outward of the casing. Means are provided for securing the outer ends of the sleeves around the cables that extend therethrough forming a sleeve-like chamber around the cable which chamber is tapered at the ends. The sleeve-like chamber is filled with a suitable potting compound that preferably adheres to the cable. The shear area between the cable and the potting compound is relatively large so that the resistance to shear forces is large. To increase the resistance to shear forces the surface of the cable in contact with the potting compound has fixed thereto, annular rings. In addition the shear area between the cable and the potting compound can be further increased by making the cover for the cone-shaped casing from two spaced cover or end plates. A suitable sleeve is disposed between the cover plates and extends to the plates, coaxial with the cable. The sleeve is also filled with potting compound.

The invention provides other objects and features of advantage; some of which, with the foregoing, will be set forth in the following description of the preferred embodiment of the invention. However, the invention is not limited to the disclosed embodiment, but includes other variant embodiments thereof within the scope of the claims.

Referring to the drawings:

FIG. 1 shows an external view of an assembled sealing assembly incorporating the features taught by this invention;

FIG. 2 is an enlarged right end view of the sealing assembly of FIG. 1;

FIG. 3 is an enlarged axial section of the sealing assembly taken on line 3—3 of FIG. 1;

FIG. 4 is a transverse section of the sealing assembly taken on line 4—4 of FIG. 3 and in the direction of the arrows; and FIG. 5 is another transverse section taken on line 5—5 of FIG. 3 in the direction of the arrows.

Referring to the drawings in greater detail and to FIGS. 1 and 2, in particular, the sealing assembly in the embodiment shown has a streamlined elongated body 10 with four electrical cables 11, 12, 13 and 14 projecting from one end thereof as shown. The four cables 11 to 14, are of two different sizes, but they can all be the same size or they can all be different sizes. Also, the body 10 of the sealing assembly can be constructed to provide a splice chamber for more than four cables and as little as two cables.

Referring to FIG. 3, the internal structural details of the sealing assembly are shown. The body 10 of the sealing assembly has a cone-shaped laminated casing (more clearly shown in FIGS. 4 and 5) comprising an outer structural casing 16 and an inner structural casing 18 made of, for example, fiber glass impregnated with plastic that is capable of withstanding relatively large loads, i.e., pressure differentials or other forces exerted thereon. Sandwiched between the inner and outer structural casings 16 and 18, are outer and inner polyethylene insulating members 20 and 22 and between them is disposed an electromagnetic shield 24 made of magnetic shielding material, for example, mu metal.

An inner metallic cover plate 26, also of magnetic shielding material, is disposed over the opening of the inner casing 18 with an O-ring 25 providing a seal between them. An enclosed chamber free from external electromagnetic energy, that is gas tight, is formed. An axially disposed rod 28 made of, for example, fiber glass and plastic for strength and insulation holds the two together. The rod 28, being threaded at both ends, engages tapped threads in the inner cover plate 26 and tapped threads in a fitting 29 imbedded in the bottom of the inner casing 18. The inner cover plate 26 is seated and secured to the casing 18 by rotating the casing 18 to thread the rod into the fitting 29 and the threaded opening in the cover plate 26. The inner cover plate 26 has four openings one for each cable, of which two openings 31 and 32 are shown in FIG. 3. Protruding inward into the inner casing 18 from each opening in the cover plate 26 is a tapered rubber boot, 35, 36, 37 and 38 (see FIG. 4). Suitable annular boot keepers 39 are threaded into internal threads formed at each opening to seal the respective rubber boot firmly to the periphery of the opening. Since the function of the rubber boots is to provide an air-tight seal between it and the cover plate 26, a radially outward bearing pressure is produced on the rubber by a tapered annular end 40 on each keeper 39 so that as the keeper is tightened, a folded-back flange 41 on the respective boot is pressed against the inner cover 26. The other end of the rubber boots 35 to 38 being tapered are stretched around an inner insulation jacket 42 of the respective cables 11 to 14 to form an air-tight seal therewith.

An outer metallic cover plate 43 made, for example, of steel, is disposed over the opening of the outer casing 16 and fastened thereto by a split-band (Morman) clamp 44 that engages a flange 43' on the cover and a flange 16' on the outer casing 16. The clamp 44 is of the type that urges the flanges 43' and 16' against each other to compress an O-ring 46 when two bolts 47 (FIG. 2) are tightened. The outer cover plate 34 like the inner cover plate 26 also has four openings of which only two openings 48 and 49 are shown in FIG. 3. Protruding outward from each opening in the outer cover plate 43 is a tapered metallic boot 51, 52, 53 or 54 (FIG. 2) made of, for example, relatively thin brass. The outer end of the boots 51, 52, 53 and 54 is clamped to outer jacket 55 of the respective cable 11–14 by clamps 56 while the ends adjacent the cover plate 43 are secured by suitable annular keepers 57 threaded into internal threads on the cover.

Between the covers and around each cable 11, 12, 13 and 14 are disposed metal sleeves, for example, sleeves 58, 61 and 62 shown in FIG. 3 and made of brass. The sleeves extend between the cover plates 26 and 43.

The sealing assembly of this invention is preferably used to splice electrical cables having a particular type of structure. However, different electrical cables can be spliced using the teachings of this invention than the cable to be now described. The electrical cables 11 to 14 as shown in FIG. 3, each include multiple electrically conductive wires 72, each insulated from each other. The wires are enclosed by the inner insulation jacket 42 that also provides a fluid conduit under pressure. An electromagnetic shielding armor 67 in the form of corrugated steel is over the inner insulating jacket 42. An outer insulation jacket 66, made of polyethylene is over the shielding armor 67 with a ground armor 65 over jacket 66. The ground armor is preferably made of corrugated copper. The outer protective jacket is placed over the ground armor 65. The ground armor 65 for all the cables is connected in common to the cover plate 43 by straps 70 and bolts 71.

The ends of the cables are preferably prepared and assembled in the sealing assembly, as shown. The wires 72 are spliced by suitable splicers 73. The space between the cables and the rubber boots, the metal sleeves, and the metal boots is filled with a suitable plotting compound 75 which when it hardens, grips the cables so that the pressure within the inner casing does not push out the cables. A suitable potting compound is, for example, epoxy resin, having a coefficient of expansion similar to the surrounding structure. To increase the bond and shear stress between the potting compound 75 and the cable, polyethylene rings 76 are bonded to the outer insulation jacket 66 as shown.

One sealing assembly can be made to accommodate any number of cables by providing suitable blanks to seal the unused bores or openings in the cover plates. Although the openings in the cover plates are shown in various sizes to accommodate various size cables, the openings can be all of the same size. Then to accommodate various cable sizes the inner rubber boots and the outer metal boots need to be of various sizes for the different cables. Another more direct approach for accommodating various numbers and sizes of cables is to provide a series of different cover plates and a series of boots and various combinations of these covers and boots provide the combination desired. From the foregoing explanation other modifications and changes from the preferred physical embodiment of the invention will occur to those skilled in the art. Therefore, the invention is not limited to the specific details described herein. In the light of the above teachings, various modifications and variations of the present invention are contemplated and will be apparent to those skilled in the art without departing from the spirit and scope of the invention.

We claim:

1. A sealing assembly for enclosing spliced ends of electrical cables comprising a hollow body having an opening; an inner cover and an outer cover disposed in spaced apart relationship and closing said opening in said body, said inner cover and said outer cover each having a bore formed therein and being coaxially aligned; a sleeve disposed between both said covers and coaxial with said bores in each of said covers; a first tapered boot fixed to said outer cover and disposed coaxial with said bore therein and extending outwardly from said hollow body; a second tapered boot fixed to said inner cover and disposed coaxial with said bore therein to protect inwardly of said hollow body; an electrical cable disposed coaxial with and through said boots, sleeve and bores; and a potting compound disposed between said cable and said boots, sleeve, and bores for holding said cable securely in place in said assembly.

2. The sealing assembly of claim 1 wherein a fluid tight seal means is provided between said covers and said hollow body, said second tapered boot is made of a resilient material and forms a fluid tight seal with said cable and said inner cover, said cable having a moisture barrier enclosing a plurality of conductors and disposed about said conductor to pipe gas by the conductors, and said barrier terminates within said hollow body whereby the gas is enclosed and past into and through said hollow body enclosure.

3. The sealing assembly of claim 1 wherein said hollow body comprises an electromagnetic shielding element laminated between two plastic elements, and said cover is comprised of an electromagnetic shielding material.

4. A sealing assembly for splicing ends of electrical cables comprising an inner hollow body having an opening; an inner cover closing said opening in said inner body; an outer hollow body having an opening disposed to receive said inner body; an outer cover closing said opening in said outer body; said inner cover and outer cover each having a bore formed therein; a sleeve disposed between both said inner and outer covers and coaxial with said bores in each of said covers; a first tapered boot fixed to said outer cover and disposed coaxial with said said bore therein and extending outwardly; a second tapered boot fixed to said inner cover and disposed coaxial with said bore therein and extending inwardly; an electrical cable disposed coaxial with and through said boots, sleeve, and bores; and a potting compound disposed between said cable and said boots, sleeve, and bores for holding said cable securely in place in said assembly.

5. The sealing assembly according to claim 4 wherein an electromagnetic shielding element is sandwiched between said inner and said outer hollow bodies, said inner and outer covers, said sleeve and said first tapered boot consist in electromagnetic shielding material, and said second tapered boot is made of a resilient material and is stretched over said cable to form a fluid-tight seal therewith.

6. A sealing assembly for use in combination with spliced electrical cables, and sealing assembly comprising: an inner cone-shaped casing, an inner cover having at least two bores and seated in said inner casing, means for securing said inner cover to said inner casing, an outer cone-shaped casing with said inner casing disposed therein; an outer cover having at least two bores and closing said inner casing, sleeves disposed between both said inner and outer covers and each sleeve being coaxial with a pair of opposing bores in said covers; first tapered boots fixed to said outer cover and disposed coaxial with each of said bores thereon extending outward; second tapered boots fixed to said inner cover and disposed coaxial with each of said bores therein extending inward; electric cables each having one end extending through one of said first tapered boots, said sleeves, said second tapered boots, and said bores in each of said covers; and a potting compound disposed between each of said cable and said boots, sleeve, and bores for holding said cables securely in place.

7. The combination of claim 6 wherein a cone-shaped electromagnetic shielding element is sandwiched between said inner and said outer casing, said inner cover is made of electromagnetic shielding material, said sleeves and said first tapered boots are made of electromagnetic material, a clamp is disposed around each of said first tapered boots to apply clamping pressure around said cable, and said second tapered boots are made of a resilient material and are stretched over each of said cable to form a seal therewith.

8. The combination of claim 7 wherein said electrical cables include a plurality of electrical wires, an inner insulation jacket, an electromagnetic shielding armor, an outer insulation jacket, a ground armor, and an outer protective jacket disposed in order around said wires; the ends of said cables being prepared wherein said second tapered boots makes contact with said inner insulation jacket, said outer insulation jacket has at least one ring bonded thereto to increase the shear stress between said potting compound and said cables, and said grounded armors of each of said cables are connected in common.

9. The combination of claim 8 wherein said means for fastening said inner casing to said inner cover includes a rod threaded at both ends, an internal thread formed in the bottom of said inner cone-shaped casing and an internal thread formed on the inside surface of said cover, said rod is threaded both ends to said internal threads, and a sealing means is disposed between said inner cover and said inner casing.

10. The combination of claim 9 wherein an inner cone-shaped insulation is disposed between said inner casing and said electromagnetic shielding element, and an outer cone-shaped insulation is disposed between said outer casing and said electromagnetic shielding element.

References Cited by the Examiner
UNITED STATES PATENTS

| | | | |
|---|---|---|---|
| 1,801,900 | 4/1931 | Brazier | 174—91 |
| 3,054,847 | 9/1962 | Colbert | 174—88 |

JOHN F. BURNS, *Primary Examiner.*

DARRELL L. CLAY, *Examiner.*